United States Patent
Skinner et al.

(10) Patent No.: US 8,254,530 B2
(45) Date of Patent: Aug. 28, 2012

(54) AUTHENTICATING PERSONAL IDENTIFICATION NUMBER (PIN) USERS

(75) Inventors: Evan Garrick Skinner, Eastleigh (GB); Matthew Whitbourne, Horndean (GB)

(73) Assignee: International Business Machines Corporation, Armonk, NY (US)

( * ) Notice: Subject to any disclaimer, the term of this patent is extended or adjusted under 35 U.S.C. 154(b) by 1400 days.

(21) Appl. No.: 11/563,915

(22) Filed: Nov. 28, 2006

(65) Prior Publication Data

US 2007/0121813 A1 May 31, 2007

(30) Foreign Application Priority Data

Nov. 29, 2005 (GB) .................................. 0524247.4

(51) Int. Cl.
*H04M 1/64* (2006.01)

(52) U.S. Cl. ............... 379/88.02; 379/88.19; 379/93.03; 379/142.05; 704/246

(58) Field of Classification Search .... 379/88.01–88.04, 379/188, 355.01, 88.19, 88.21, 93.03, 142.05, 379/201.11; 704/246, 276, 231, 235, 251, 704/252, 260, E17.016

See application file for complete search history.

(56) References Cited

U.S. PATENT DOCUMENTS

| | | | | |
|---|---|---|---|---|
| 5,717,743 A * | 2/1998 | McMahan et al. | ............ | 379/188 |
| 5,721,765 A | 2/1998 | Smith | | |
| 6,073,103 A * | 6/2000 | Dunn et al. | .................... | 704/276 |
| 6,847,717 B1 * | 1/2005 | Bossemeyer, Jr. | ....... | 379/355.01 |
| 2002/0174067 A1 | 11/2002 | Hoffman et al. | | |
| 2004/0010408 A1* | 1/2004 | Mani | ............................ | 704/246 |

FOREIGN PATENT DOCUMENTS

| | | |
|---|---|---|
| DE | 10233512 A1 | 2/2004 |
| EP | 1396779 A2 | 3/2004 |
| WO | WO 02/49322 | 6/2002 |

* cited by examiner

*Primary Examiner* — Md S Elahee
(74) *Attorney, Agent, or Firm* — Thomas E. Lees, LLC

(57) ABSTRACT

In systems which support oral entry of Personal Identification Number (PIN) values in order to establish access to user accounts, a user is prompted to enter the PIN value for a particular account. The entered PIN value is analyzed by a speech recognition engine to extract both a multi-digit number and the user's expression of that number. The extracted multi-digit number is compared to a multi-digit number stored in a user record associated with the account. If the user previously specified that expression matching is required, the extracted expression of the multi-digit number is compared to a preferred expression stored in the user record. Matches must be found for both the numbers and the form in which those numbers are expressed in order for the user to be authenticated. The user may elect to dispense with the expression matching requirement.

17 Claims, 2 Drawing Sheets

AUTHENTICATING PERSONAL IDENTIFICATION NUMBER (PIN) USERS

FIELD OF THE INVENTION

This invention relates to authenticating system users and more particularly to authenticating system users that identify themselves by spoken PIN entries.

BACKGROUND OF THE INVENTION

A number of enterprises operate computer systems that maintain accounts for multiple users. In many cases, the users access the accounts from remote locations. An on-line banking system, which enables a user to remotely access checking and savings accounts, is probably the best-known example of such a system.

At a minimum, a user must enter a valid account identifier, usually an account number, to begin the access process. However, to improve security, most systems also require that the user enter a multi-digit Personal Identification Number or PIN before the user will actually be able to access the accounts and conduct transactions.

Conventionally, users entered the account number and any required PIN numbers by keying in the digits at a personal computer or other computer terminal. In the interests of making it easier for users to establish access to their accounts when a personal computer or computer terminal is not readily available, an increasing number of systems operations are giving users the option of entering account numbers and PIN values orally. Such systems, often referred to as interactive voice response systems, employ speech recognition technology to recognize spoken numbers and to convert them to an electronic form usable by the computer system.

Conventionally, a PIN is thought of only as a multi-digit number, usually four to six digits in length. Because the number is often assigned to, rather than chosen by, the user, it may have no personal significance to the user and thus be hard to remember. Many users write the numbers down rather than taking the chance of forgetting them when they need them. Keeping a written record of a PIN number, while an understandable practice, increases the risk that an unauthorized user will see the written record and become enabled to access the system that is supposed to be protected by the PIN.

System security can, of course, be enhanced by requiring that a user provide additional information unrelated to the PIN number values before the user will be considered authenticated and given access to the protected system. If the additional information has no relationship to the PIN numbers, it may be difficult for a user to recall, leading to the user to again write down all of the necessary information in a readily accessible place. Moreover, the requirement for additional information can impose a significant extra burden on the user, which is inconsistent with the original goal of making it easier for users to access their accounts.

If additional information is to be required of a user, it is desirable that the additional information be of a nature that allows it to be readily recalled, thereby reducing or eliminating any extra burden on the user.

U.S. Pat. No. 5,721,765 discloses a PIN security system which makes use of a time dimension to provide better security than is provided by a system which relies solely on entered numbers in order to authenticate a user. According to this patent, the numbers in the PIN are separated into two or more digit groups. When the user is attempting to access a PIN-protected system, the digit groups must be entered according to a pre-defined time pattern in order to positively identify the user. As an arbitrary example, assume a user has a PIN number 2468135. Such a number could be divided into temporal groups 24, 6813 and 5. The user might be required to pause at least one second between finishing entry of the first group "24" and beginning entry of the second group "6813" and to pause at least two seconds between finishing entry of the second group "6813" and beginning entry of the third group "5". Optionally, the user might be required to enter all three numbers in the second group "6813" within two seconds.

While this system does provided enhanced security, it also requires that the user remember additional information that may not be readily recalled by the user. The net result is that user may be tempted to write down not only the number sequence but also the temporal sequence thus creating the same type of security exposure the approach was intended to overcome There remains a need for an enhanced PIN-based security system that requires something beyond entry of only a number sequence without leading to a requirement that a user remember additional information that is user is unlikely to readily recall.

SUMMARY OF THE INVENTION

One embodiment of the present invention is a method for use in a system capable of receiving oral or spoken input from users. A user is prompted to orally input a multi-digit personal identification number or PIN. The user's input is processed to extract a multi-digit number and an expression of that number. The multi-digit number is used to extract a user record having the same multi-digit number. If the user record also contains a preferred expression of a multi-digit number, the user is authenticated only if the extracted multi-digit number matches the stored multi-digit number and the extracted expression matches the stored preferred expression.

BRIEF DESCRIPTION OF THE DRAWINGS

An embodiment of the invention will now be described with reference to the accompanying drawings in which.

DETAILED DESCRIPTION

Figure 1:
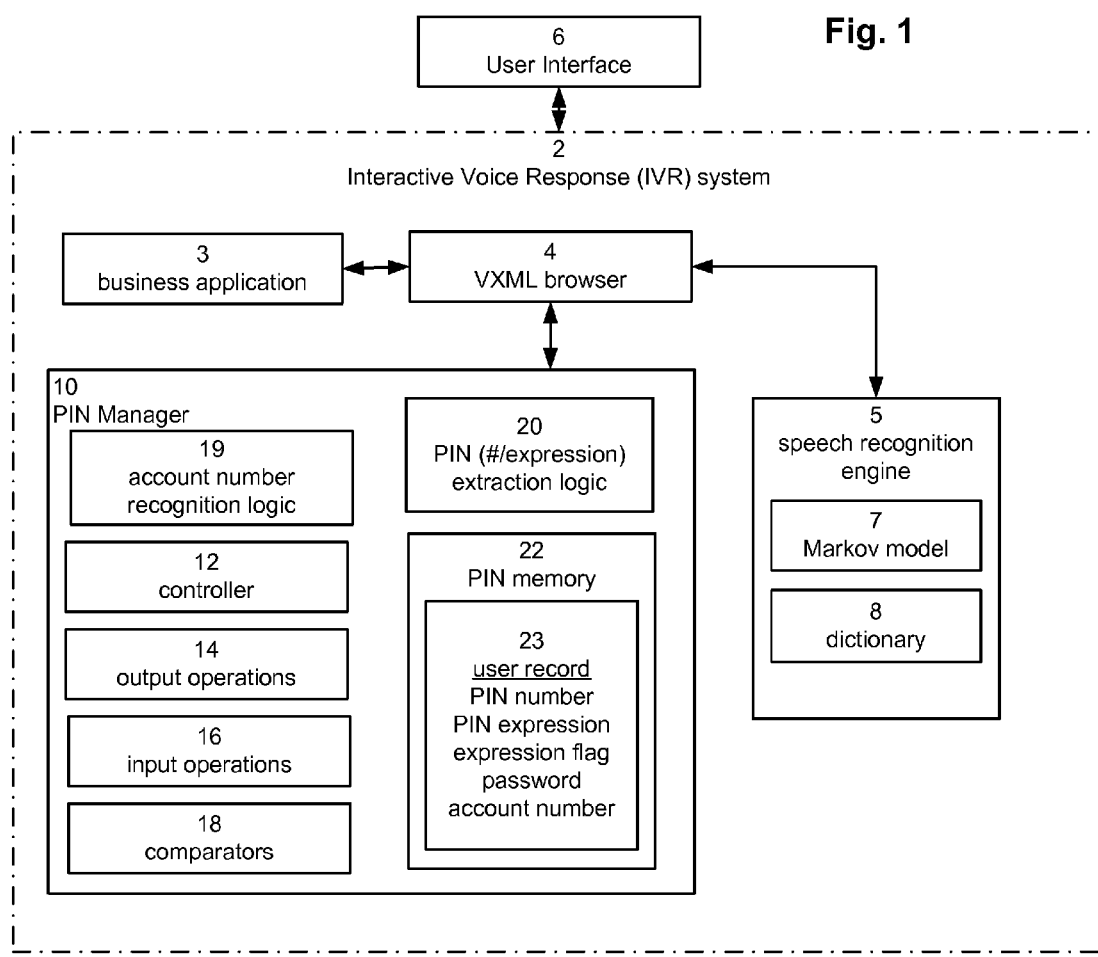
FIG. 1 is a schematic of an interactive voice response system including the present invention.

In a preferred embodiment, the invention is part of an interactive voice response system (IVR) 2 that includes a VXML business application 3, a VXML browser 4, a speech recognition engine 5 and a personal identification number (PIN) manager 10.

IVR 2 is modeled on IBM WebSphere® Voice Response system v3.2 although other functionally equivalent voice response systems might be used. A user communicates with the IVR 2 through user interface 6 which can be a telephone, microphone headset or any other device capable of receiving spoken input from the user.

Business application 3 is an application written in Voice XML (VXML) that requires authentication. For example, the business application may retrieve a bank balance but only after identifying a user (by identifying the user account for instance) and then requesting authentication of that user. VXML browser 4 interprets the business application 3. The authentication process can include a user account number and is carried out by PIN manager 10.

The IVR system includes a speech recognition engine 5 such as IBM WebSphere Voice Server v5 although any speech recognition engine providing text output could be used. The speech recognition engine preferably is configured to include delimiters between numbers. Speech recognition engine 5 receives requests from VXML browser 5 to translate speech data and passes text data back to VXML browser 4. In a preferred embodiment, speech recognition engine 5 uses a Markov model 7 to establish the most likely phoneme match to speech data and then uses a dictionary 8 to establish the most likely number match for a given phoneme.

The PIN manager 10 is preferably an application written in VXML. PIN manager 10 preferably includes: a controller 12; output operations logic 14; input operations logic 18; account number recognition logic 19; PIN extraction logic 20; and PIN memory 22.

The controller 12 controls the process of authenticating the user, including the flow between the PIN manager components.

The PIN memory 22 stores PINs and associates each one with a user account. The PIN memory stores a record 23 for each registered user. Each record preferably comprises a field for: a user account number; a user PIN; a preferred PIN expression; a PIN flag; and a password for a supplementary authentication operation.

Prior to the start of any authentication operation, the user may be prompted to enter an account number. The speech recognition logic 5 is used to recognize the numbers entered by the user in response to this prompt. The account number recognition logic 19 accepts the recognized numbers and determines whether there is match between the recognized numbers and any account number stored in PIN memory 22. If no match is found, the user may be prompted to re-enter the account information. Conventionally, if a user fails to enter a valid account number after a predetermined number of tries, the user is locked out of the system.

Alternatively, the user may be able to enter the account number by using an access card with the account number recorded in a magnetically encoded stripe. These techniques for receiving and recognizing account numbers are considered conventional and are not a part of the present invention. The following description assumes that that user has, either orally or through user of an encoded card or some other data entry device, successfully entered an account number matching one of the accounts contained in PIN memory 22.

As will be discussed in more detail below, the output operations 14 include: prompting a user for a PIN; prompting the user for a password if the input PIN number matches a stored PIN but the expression of the input number does not match a stored expression preference; and prompting the user to require adherence to a preferred expression of a PIN number as a condition of successful authentication of the user.

Also as will be discussed in more detail below, the input operations include: recording a user input of a PIN number; recording, under some conditions, an entered password; and setting, also under some conditions, a flag indicating whether the user wishes to require adherence to a preferred expression of a PIN as a condition of a successful authentication.

The invention requires the use of several comparators, indicated collectively as comparators 18. A first comparator is for checking whether an entered PIN number matches the PIN number stored in the user record for the selected account. A second comparator is used for checking whether the expression of the entered PIN number matches a preferred expression stored in the user record. A third comparator is used, under conditions described below, to determine whether a user-provided password matches a password stored in the selected user record.

To simplify the demands of the PIN recognition process, the dictionary 8 in speech recognition engine 5 may be restricted to a few numerical utterances. For instance, the dictionary may be limited to the following utterances: zero; oh; one; two; three; four; five; six; seven; eight; nine; ten; eleven; twelve; thirteen; fourteen; fifteen; sixteen; seventeen; eighteen; nineteen; twenty; thirty; forty; fifty; sixty; seventy; eighty; ninety, hundred; thousand; million. In one possible embodiment, the size of the dictionary can be reduced making "teen" a separate utterance. Fourteen, sixteen, seventeen, eighteen, and nineteen would be then expressed by two utterances each; e.g., fourteen would be recognized as a combination of "four" followed by "teen".

A dictionary limited to the utterances described above would enable a user to enter nearly a million different PIN numbers and to express those numbers in several different ways.

The term "expression" is used a number of times in both the preceding and following material. The intended meaning of that term will now be explained. It is recognized that most people habitually express multiple digit numbers according to a particular format learned early in life. For example, while there is only one way to say the number "1" (at least in English), there are two ways to utter the number "12"; i.e., either "one-two" or "twelve". Similarly, there are at least three ways to utter the number "123"; i.e., "one-two-three", "one hundred, twenty-three" and "one hundred and twenty-three". There are several ways to utter the number "1234"; i.e, "one-two-three-four", "twelve-thirty-four", "one thousand, two hundred, thirty-four" and "one thousand, two hundred and thirty-four".

Even if the actual values of the digits change in an n digit number, a user will, as a matter of habit, use the same format or expression in uttering that number. For example, if a user ordinarily utters the number "1234" as "one thousand, two hundred thirty-four", that same user will probably utter the number "5678" as "five thousand, six hundred, seventy-eight". Thus, while the actual digits in the four digit number change, the expression of the number (x thousand, y hundred, a tens value, a singles value) does not change.

Most users can readily recall that they habitually utter n-digit numbers using the same format or expression without regard to the actual value of each of the digits. That awareness can be used to enhance the security offered by PIN-based authentication systems without imposing a significant additional burden on the user. In a system constructed in accordance with the present invention, a user may not be fully authenticated unless that user can not only provide the correct digits in a multi-digit number but also provide those digits in a preferred format or expression specified in the user records maintained by the authentication system.

The PIN extraction logic 20 receives input from speech recognition engine 5 and extracts both the PIN numbers and the expression of those numbers by the user. The different possible expression of a given set of numbers can be expressed by the use of delimiters which are embedded by speech recognition engine 5. Normal voice entry of a PIN comprises three delimiters and a fourth if a last delimiter to indicate the end of a PIN is included, for instance "one, two, three, four". Grouping the digits into two digit numbers reduces the number of delimiters to two, for instance, "twelve, thirty four." Grouping the digits into a single four digit number reduces the number of delimiters to one, for instance. "One thousand two hundred and thirty four.". The composite PINs for these three example are respectively: "1#2#3#4#", "12#34#" and "1234#".

It will be noted that an expression such as "One thousand two hundred and thirty four" contains an internal delimiter "and". Internal delimiters are defined to include commas and "and"s inside the text of a number over 100, for instance: "a hundred and one", "one thousand, two hundred and thirty four". The composite PIN is parsed to remove internal delimiters. The multi-digit PIN number is extracted from the parsed composite PIN by filtering the digits and in all three examples the PIN is "1234". The expression is extracted by replacing all digits in the parsed composite PIN with a digit indicator, for instance "0", and all delimiters by a delimiter symbol, for instance, "#". In the three examples therefore, the representations of the various expressions are, respectively: "0#0#0#0#", "00#00#" and "0000#".

The steps executed in authenticating a PIN entry in the preferred embodiment will be described with reference to FIG. 2, which assumes that the user has already entered a valid account number in some manner and that a user record associated with that account number has been identified and retrieved..

In step 202, the user is prompted to orally enter the PIN for the established account. The user's oral input is recorded in step 204 and the recording is passed on to the speech recognition engine 205. The speech recognition engine 5, using both the Markov model and the dictionary discussed earlier, processes the recorded input to generate the composite PIN made up of a multi-digit number combined with delimiters representing the user's expression of that multi-digit number.

In step 206, the PIN extraction logic 20 extracts a multi-digit number and the expression of that number from the composite PIN. In step 208, the extracted multi-digit number is compared to the multi-digit number stored in the identified user record. If the extracted number does not match the stored number, the authentication attempt fails.

Figure 2:
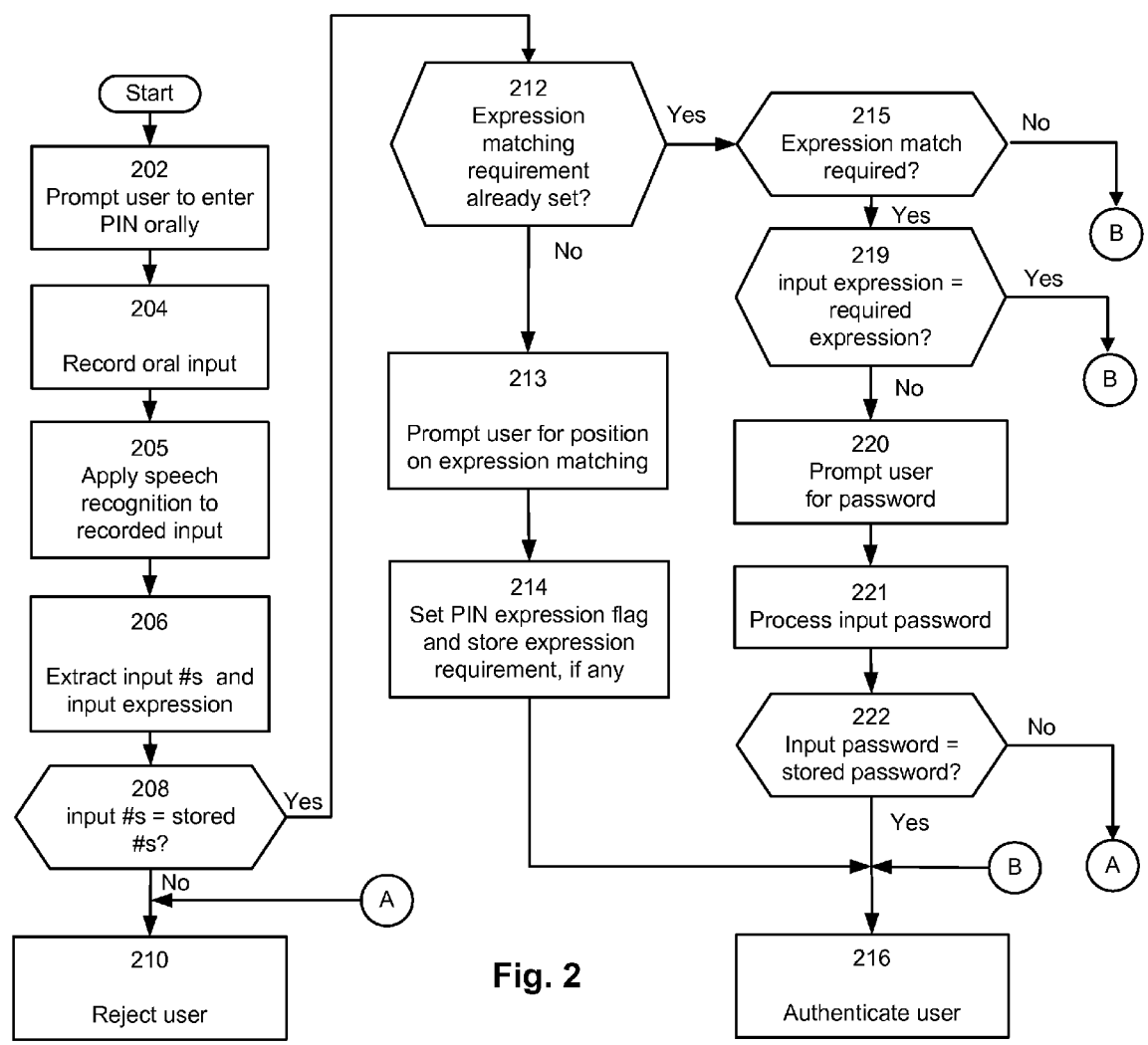
FIG. 2 is a flow chart of operations that are performed during use of the present invention.

Although not shown in FIG. 2, a user would conventionally be notified of the failure by the interactive voice response system and give at least one more opportunity to enter the correct PIN value. Typically, a user is given 3-5 chances to enter a correct PIN number before the system finally terminates the authentication process. The steps a user must then take before beginning a new authentication attempt may vary from system to system but are not discussed here as they are not a part of the present invention.

If the authentication attempt fails in step 208, the user is rejected in step 210 and is not allowed to access the business application requiring authentication.

If, however, step 208 determines that there is a match between the extracted multi-digit number and the number stored in the identified user record, the authentication process is not yet complete. The system, in step 212, retrieves a flag from the identified user record. The flag value indicates whether the user previously specified a requirement for expression matching as part of the authentication process.

If step 212 shows that the user has not yet indicated whether expression matching is a requirement in the authentication process , then the user is prompted in step 213 to indicate whether or not future authentication attempts should include an expression matching requirement. The PIN expression flag in the user record is set in step 214 to reflect the user's position. If the user opts for the expression matching requirement, the expression that must be matched in future authentication attempts is also recorded in the user record in same step. The user is then authenticated in step 216 without regard to whether the user wants to require expression matching in future authentication attempts.

Although not shown in the drawing, the system may repeat the PIN numbers back to the user using the expression thought to be preferred by the user. This step allows the user to confirm the preferred expression is correctly recorded in the user record.

If step 212 had shown the user has already entered a position on an expression matching requirement, control would pass to step 215, which determines whether expression matching is or is not required. If the user has already specified expression matching is not to be required, control passes directly to step 216 in which the user is authenticated.

If step 215 indicates that expression matching is required, control passes to step 219, in which the extracted expression is compared to the expression required by the user record. If the extracted expression matches the stored expression, control passes to step 216 in which the user is authenticated.

If step 219 determines the extracted expression does not match the stored expression, in a preferred embodiment, the user is prompted for an account password in a step 200. The user's input is analyzed in step 221. If step 222 shows the input password matches the stored password, the user is still authenticated in step 216, notwithstanding the expression mismatch. If step 222 shows the input password does not match the stored password, the user is then rejected in step 210.

In an alternate embodiment of the invention, the second chance provided by the password process 220, 221 and 222 might be eliminated. In this alternate embodiment, if step 219 shows a mismatch between the extracted expression and the stored expression, the user would be rejected without being given an opportunity to enter a password.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

What is claimed is:

1. A method of authorizing users in a system capable of receiving spoken input from users, the method comprising:
   retrieving a user record from a set of user records, each user record containing at least a stored multi-digit number and a stored expression of the stored multi-digit number, wherein the stored expression is based upon a particular utterance of the stored multi-digit number, where the particular utterance comprises a select one of many ways to utter the stored multi-digit number;
   prompting a user to input a Personal Identification Number (PIN);
   recording the user's input in response to the prompt;
   processing the user's input to derive an extracted multi-digit number;
   processing the user's input to derive an extracted expression, wherein the extracted expression corresponds to the user's format in expressing the extracted multi-digit number; and
   authorizing the user if the extracted multi-digit number matches the stored multi-digit number in the retrieved user record and the extracted expression matches the stored expression in the retrieved user record.

2. The method as set forth in claim 1 further comprising:
   prompting the user to input a password if the extracted multi-digit number matches the stored multi-digit number but the extracted expression does not match the stored expression;
   recording the user's input;
   processing the user's input to extract a potential password; and
   authorizing the user if the extracted password matches a password stored in the retrieved user record.

3. The method as set forth in claim 2 wherein prompting the user to input a password further comprises:
   prompting the user to make a decision whether the extracted expression should be stored in the user record for future use as the stored expression in response to a determination that the retrieved user record contains a stored multi-digit number that matches the extracted multi-digit number but does not contain data for the stored expression;
   storing the extracted expression in the user record responsive to a first response from the user; and
   setting a flag to indicate that a number's expression should not be used in future authorization operations involving the user responsive to a second response from the user.

4. The method as set forth in claim 1, wherein:
   retrieving a user record from a set of user records comprises, first, processing the user's input to derive the extracted multi-digit number; and
   using the extracted multi-digit number to extract the user record having the stored multi-digit number matching the extracted multi-digit number.

5. The method as set forth in claim 1, further comprising:
   restricting a dictionary of utterances to zero; oh; one; two; three; four; five; six; seven; eight; nine; ten; eleven; twelve; thirteen; fourteen; fifteen; sixteen; seventeen; eighteen; nineteen; twenty; thirty; forty; fifty; sixty; seventy; eighty; ninety, hundred; thousand; and million;
   wherein:
   processing the user's input to derive an extracted multi-digit number comprises recognizing the multi-digit number based upon the dictionary utterances.

6. The method as set forth in claim 1, further comprising:
   restricting a dictionary of utterances to zero; oh; one; two; three; four; five; six; seven; eight; nine; ten; eleven; twelve; teen; twenty; thirty; forty; fifty; sixty; seventy; eighty; ninety, hundred; thousand; and million;
   wherein:
   processing the user's input to derive an extracted multi-digit number comprises recognizing the multi-digit number based upon the dictionary utterances.

7. The method as set forth in claim 1, wherein:
   processing the user's input to derive an extracted multi-digit number comprises parsing the user's input to remove internal delimiters before extracting the multi-digit number.

8. The method as set forth in claim 1, wherein:
   retrieving a user record from a set of user records, each user record containing at least a stored expression of the stored multi-digit number, comprises:
   identifying a number of delimiters used to store the multi-digit number such that the number of delimiters determines the number of numerical utterances that the stored expression of the stored multi-digit number can be parsed into.

9. A system for authorizing a user based on spoken input provided by the user, said system comprising:
   a controller component for retrieving a user record from a set of user records, each user record containing at least a stored multi-digit number and a stored expression of the stored multi-digit number, wherein the stored expression is based upon a particular utterance of the stored multi-digit number, where the particular utterance comprises a select one of many ways to utter the stored multi-digit number;
   a first user interface component for prompting a user to input a Personal Identification Number (PIN);
   a storage component for storing a recording the user's input in response to the prompt;
   a speech recognition component for processing the user's input to derive an extracted multi-digit number and for processing the user's input to derive an extracted expression, wherein the extracted expression corresponds to the user's format in expressing the extracted multi-digit number; and
   an authentication component for authorizing the user if the extracted multi-digit number matches the stored multi-digit number in the retrieved user record and the extracted expression matches the stored expression in the retrieved user record.

10. The system as set forth in claim 9 wherein the authentication component further comprises logic for rejecting the user if no match is found between the extracted multi-digit number and any stored multi-digit number in the set of user records.

11. The system as set forth in claim 10 wherein the authentication component further comprises:
   a second user interface for, responsive to a determination that the extracted number matches the stored number but the extracted expression does not match a stored expression, prompting the user to input a password;
   logic for recording the user's input in the storage component;
   speech recognition logic for processing the user's input to extract a potential password; and
   logic for authorizing the user if the extracted password matches a password stored in a user record in the set of user records.

12. The system as set forth in claim 9, wherein:
   the controller component for retrieving a user record from a set of user records retrieves the user record by matching the user record having the stored multi-digit number with the extracted multi-digit number derived by the speech recognition component.

13. The system as set forth in claim 11 including a third user interface invoked prior to the second user interface, the third user interface including:
   logic that responds to a determination that the retrieved user record contains a stored multi-digit number that matches the extracted multi-digit number but does not contain a stored expression by prompting the user to make a decision whether the extracted expression should be stored in the user record for future use as a stored expression; and wherein:
   the authentication component responds to a first input from the user by storing the extracted expression in the user record and responds to a second response from the user by setting a flag in the user record to indicate that a number's expression should not be used in future authentication operations involving the user.

14. A computer-readable storage memory with an executable program for authorizing users in a system in which user input is received in the form of user utterances stored thereon, wherein the program instructs a microprocessor to perform:
   retrieving a user record from a set of user records, each user record containing at least a stored multi-digit number and a stored expression of the stored multi-digit number, wherein the stored expression is based upon a particular utterance of the stored multi-digit number, where the particular utterance comprises a select one of many ways to utter the stored multi-digit number;
   prompting a user to input a multi-digit Personal Identification Number (PIN);
   recording the user's input in response to the prompt;
   processing the user's input to derive an extracted multi-digit number;
   processing the user's input to derive an extracted expression, wherein the extracted expression corresponds to the user's format in expressing the extracted multi-digit number; and
   authorizing the user if the extracted multi-digit number matches the stored multi-digit number in the retrieved user record and the extracted expression matches the stored expression in the retrieved user record.

15. The computer readable storage memory of claim 14, wherein the program instructs the microprocessor to further perform:
   prompting the user to input a password if the extracted multi-digit number matches the stored multi-digit number but the extracted expression does not match the stored expression;
   recording the user's input;
   processing the user's input to extract a potential password; and
   authorizing the user if the extracted password matches a password stored in the retrieved user record.

16. The computer readable storage memory of claim 15, wherein the program instructs the microprocessor to further perform:
   prompting the user to make a decision whether the extracted expression should be stored in the user record for future use as the stored expression in response to a determination that the retrieved user record contains a stored multi-digit number that matches the extracted multi-digit number but does not contain data for the stored expression;
   storing the extracted expression in the user record responsive to a first response from the user; and
   setting a flag to indicate that a number's expression should not be used in future authentication operations involving the user responsive to a second response from the user.

17. The computer readable storage memory of claim 14, wherein the program instructs the microprocessor to further perform:
   retrieving a user record from a set of user records comprises, first, processing the user's input to derive the extracted multi-digit number; and
   using the extracted multi-digit number to extract the user record having the stored multi-digit number matching the extracted multi-digit number.

* * * * *